United States Patent
Cabello et al.

(10) Patent No.: US 8,038,938 B2
(45) Date of Patent: Oct. 18, 2011

(54) PHOTOCATALYTIC REACTOR AND PROCESS FOR TREATING WASTEWATER

(75) Inventors: Pablo Arturo Venegas Cabello, Concepción (CL); María Cristina Yeber Ortiz, Concepción (CL); Ana Lorena Narváez Dinamarca, Concepción (CL); Catterina del Pilar Sobenes Vennekool, Concepción (CL); Carlos Mauricio Ortiz Sanhueza, Concepción (CL); Héctor Valdés Morales, Concepción (CL)

(73) Assignee: Universidad Católica de la Santisima Concepción, Concepción (CL)

( * ) Notice: Subject to any disclaimer, the term of this patent is extended or adjusted under 35 U.S.C. 154(b) by 1264 days.

(21) Appl. No.: 11/669,670

(22) Filed: Jan. 31, 2007

(65) Prior Publication Data
US 2008/0179178 A1    Jul. 31, 2008

(51) Int. Cl.
*B01J 19/08*    (2006.01)
(52) U.S. Cl. ............. 422/24; 422/28; 210/748; 210/760
(58) Field of Classification Search .................. 210/748, 210/760; 422/24, 28
See application file for complete search history.

(56) References Cited

U.S. PATENT DOCUMENTS 6,409,928 B1 *    6/2002    Gonzalez et al. ......... 210/748.14
6,454,937 B1         9/2002    Horton et al.

FOREIGN PATENT DOCUMENTS

EP    1686095 A1 *    8/2006

OTHER PUBLICATIONS

Beltran et al., Oxidation of Polynuclear Aromatic Hydrocarbons in Water. 1. Ozonation, Ind Eng Chem Res, vol. 34, 1995, pp. 1596-1606.
Beltran et al., Oxidation of Polynuclear Aromatic Hydrocarbons in Water. 3. UV Radiation Combined with Hydrogen Peroxide, Ind Eng Chem Res, vol. 35, 1996, pp. 883-890.
Beltran et al., Oxidation of Polynuclear Aromatic Hydrocarbons in Water. 4. Ozone Combined with Hydrogen Peroxide, Ind Eng Chem Res, vol. 35, 1996, pp. 891-898.
Lee, et al., Selective Photocatalytic Oxidation of NH3 to N2 on Platinized TiO2 in Water, Environ Sci Technol, vol. 36, 1992, pp. 5462-5468.
Mansilla et al., ZnO-Catalysed Photodegradation of Kraft Black Liquor, J Photochem Photobiol A: Chem, vol. 78, 1994, pp. 267-273.
Mokrini et al., Oxidation of Aromatic Compounds with UV Radiation/Ozone/Hydrogen Peroxide, Water Science and Technology, vol. 35, No. 4, 1997, (10 pages).

(Continued)

*Primary Examiner* — Kishor Mayekar
(74) *Attorney, Agent, or Firm* — Hasse & Nesbitt LLC; Daniel F. Nesbitt

(57) ABSTRACT

A photocatalytic reactor with a modular configuration, based on UV light sources and a catalyst, useful for purifying and disinfecting wastewater from confined aquaculture, using Advanced Oxidation Processes (AOP), wherein the catalyst is supported over glass sheets as fixed strips within the reactor, at an established distance from the UV light source, and wherein the wastewater is treated as "batches" being re-circulated and returned to the circuit. The wastewater is fed through the lower end of the reactor and submitted to a strong turbulence when passing through perforations or holes made on the supports forming the floors that separate the reaction chambers.

21 Claims, 9 Drawing Sheets

OTHER PUBLICATIONS

Shiraishi et al., Photolytic and Photocatalytic Treatment of an Aqueous Solution Containing Microbial Cells and Organic Compounds in an Annular-Flow Reactor, Chemical Engineering Science, vol. 54, 1999, pp. 1547-1552.

Tang, et al., 2,4-Dichlorophenol Oxidation Kinetics by Fenton's Reagent, Environmental Technology, vol. 17, 1996, pp. 1371-1378.

Yeber et al., Advanced Oxidation of a Pulp Mill Bleaching Wastewater, Chemosphere, vol. 39, No. 10, 1999, pp. 1679-1688.

Zhang et al., Photocatalytic Degradation of Organic Compounds in Aqueous Solution by a TIO2-Coated Rotating-Drum Reactor Using Solar Light, Solar Energy, vol. 70, No. 4, 2001, pp. 331-337.

Bauer, et al., The Photo-Fenton Oxidation—A Cheap and Efficient Wastewater Treatment Method, Res. Chem. Intermed., 1997, vol. 23, No. 4, pp. 341-354 (14 pages).

Hapeman-Somich, et al., Aqueous Ozonation of Atrazine. Product Identification and Description of the Degradation Pathway, J. Agric. Food Chem., 1992, vol. 40, pp. 2294-2298 (5 pages).

Patton, et al., Use of Ozone and Ozone/UV for the Degradation of Pesticides, AOTs-1, The First International Conference on Advanced Oxidation Technologies for Water and Air Remedy, Ontario, Canada, Jun. 25-30, 1994, 242-243 (3 pages).

Pichat, P., Photocatalytic Degradation of Aromatic and Alicyclic Pollutants in Water: By-Products, Pathways and Mechanisms, Wat. Sci. Tech., 1997, vol. 35, No. 4, pp. 73-78 (6 pages).

Prado, et al., Degradation Of 2,4-D By Ozone and Light, Ozone Science & Engineering, 1994, vol. 16, pp. 235-245 (6 pages).

Preis, et al., Advanced Oxidation Processes Against Phenolic Compounds In Wastewater Treatment, Ozone Science & Engineering, 1995, vol. 17, pp. 399-418 (11 pages).

* cited by examiner

PHOTOCATALYTIC REACTOR AND PROCESS FOR TREATING WASTEWATER

BACKGROUND OF THE INVENTION

The present invention is related with a photocatalytic reactor based on UV light sources and a supported titanium dioxide ($TiO_2$) based catalyst, and gas ozone for producing hydroxyl radicals, useful for purifying wastewater from confined aquaculture systems, mediated by an advanced oxidative process. The photocatalytic reactor uses a substrate comprising a supported catalyst, which allows the removal of ammonium, nitrite, as well as the removal of water soluble organic matter and water disinfection, it also refers to the method for using and the operation of the same.

A variety of treatments or methods for purifying water, for removing nitrogenous compounds, and for removing the dissolved organic matter, specifically in waste water from the culturing of hydrobiologic species, are known in the prior art, said methods comply independently or in combination of their functions. Among the better known of said methods are composed of the biologic filter purification water system, the foam fractionator's purification water system, the activated charcoal purification water system, the ozonification purification water system, the UV light purification water system, etc.

The following corresponds to a brief description of the above mentioned methods, which are used for wastewater purification, specifically waste water from fish farming.

Biologic Filter Purification Water System:

This system corresponds to an equipment and supplies set, which can have diverse configurations, including from simple gravel filter through complex filtration systems. The most used configuration on intensive aquaculture, is based on the use of nitrifying bacteria, which are duly supported over a specific substrate. Different dimensions and configurations from the bed and/or rotatory types can be found in this system. The system's main features are that the bacteria-supporting medium must allow the growth of microorganisms; that a rigid operation design, i.e. for an established configuration, standard operation variables, are required; and that the system sizing depends on many different variables, such as: dissolved oxygen amount, dissolved and suspended organic material concentration, the density of the hydrobiological specie culture, the biofilter entry and exit flux, the pH value, the dissolved oxygen and ammonia concentration, the water renewal rate, among others. Also, a permanent and continuous flux of the waste water to be treated, is required.

Foam Fractionator Purification Water System:

This system corresponds to a device, using air injection through a diffuser, wherein the air is admixed with the waste water. The oxygen from air oxides and coagulates part of the dissolved organic material, thus forming foam with the organic matter, which subsequently is removed. It is a simple equipment, usually it will be formed by a PVC pipe which, when a pressed air flux entry occurs, it produces turbulence and bubbles, which contact the dissolved organic matter dissolved of the waste water, producing a foam. The main features of this system are that it can have different configurations and designs; and that the system sizing is related, among others, to the inlet air flux, the size of the forming bubble (a mean bubbling caliber of 250 to 350 nm, is recommended), the kind of gas to be used (air, from oxygen to ozone), the air application way, the gas and water flux.

Activated Charcoal Purification Water System:

This system corresponds to a device, which contains a burned plant material bed, having a microcrystalline structure, similar to the graphite one. It is a simple equipment, usually comprising a strong plastic external structure, as a container, wherein the inner part of the container contains the activated charcoal. The waste water to be treated is passed by inside the container, in order to contact with the activated charcoal. The main features of this system are: that it can have different configurations and designs; that the design, depends on the material to be used for manufacturing the activated charcoal, (which finally affects activated charcoal porosity and granulometry); and that the design is established by the required specific surface of the activated charcoal.

Ozonization Purification Water System:

This system consists of a method of using an electrochemical reaction for producing triatomic oxygen molecules, which are formed by the an oxygen molecule excitation, through a high voltage discharge. In an Ozone generator ($O_3$), through the interaction of air with a high voltage field. The system may exhibit different dimensions and configurations. The ozone amount produced is directly related with the generation and the electric discharge ability within the reaction chamber.

UV Light Purification Water System:

This system uses a device for disinfecting water by means of a UV light source. It occurs in a closed and airtight system equipment, wherein the waste water from a culture flows, contacting the UV radiation emitted by the UV lamp. It can have different configurations (number of UV lamps). The design depends on variables, such as: the waste water flux to be treated, the exposition time, the kind of bacteria, or fungus to be treated, the suspended solids concentration (turbidity), among others.

The closed and air-tight equipment, typically called a reactor, is general known and has been used and disclosed in the prior art.

The conventional way of removing the liquid pollulants produced by those intensive aquiculture processes in recirculating systems, considers the use of mechanical filtering for removing the organic material and biological filters for removing the nitrogenous compounds. The system comprising the use of UV light sources, has become the most used water desinfecting system, mainly by the low cost of the same, the treatment time and the absence of any effect over the hydrobiological cultured species. Nevertheless, its efficiency is limited by the presence of suspended solids, which causes a "shadow" or shield effect over bacteria and other microorganisms.

A good development has been achieved by these treatment systems, however, they exhibit some inconveniences, as the operation and maintenance complexity, and the non-efficient filtering, which maintains the hydrobiological species submitted to amonnium and carbon dioxide sub-lethal concentration levels.

In order to stabilize the removing ability, the biological filters require at least a 30 day period, due to the growth of the nitrosome and nitrobacter bacteria, which convert $NH_4^+$, and $NH_3$ into $NO_2$, and transform $NO_2$ into $NO_3^*$ respectively. Additionally, the bacteria must be kept at stable temperature levels, beginning from 24° C. and above the optimal temperature range for the nitrogenous compounds remotion, and a pH range value between 7 and 8. Further, these systems require a minimal dissolve ammonia concentration in water, for avoiding the bacteria inactivation or death, and its filtration efficiency is affected by the existence of the competitiveness for the environmental conditions, of other bacteria degrading organic matter. These facts can turn the biologic filter very unstable, requiring stabilization periods, which can be a risk for the continuity of the hydrobiological species production in the confined culture, causing lethal water quality levels.

Likewise, the mechanical filtering systems require sieves for retaining the suspended and dissolved particles, which require constant maintenance of the retained particles removal, in order to maintain the filter's removing efficiency.

The prior art shows a variety of studies related to organic compounds photo-oxidation, mainly for phenolic type compounds (Beltrán y et al., 1995 a,b; Preis et al., 1995; Beltrán et al., 1996 a,b; Pichat et al., 1996), which are used as a model, with the purpose of studying the mechanisms involved in the degradation. Additionally, in said studies it has been demonstrated that the photo-oxidative systems are efficient upon mineralization. Some researchers have used model compounds for studying oxidation, specifically phenolic-chlorine compounds, such as 2,4-dichlorophenol, 2,4-dichloro-phenoxyacetic acid (2,4-D), in order to assess the subsequent application of the system in removing pesticides and herbicides contained in waste water or in the treatment of industrial waste water. The oxidation of these compounds is highly efficient, achieving the complete mineralization of the same, after short treatment periods. The decomposition of black liquor from the kraft pulp process was studied in photocatalytic oxidative systems, said liquor principally contains phenolic compounds derived from lignin high concentrations, wherein it is concluded that the mineralization of phenolic derivatives occurs between 95% and 96%, by means of photocatalytic processes and not by other routes.

The organic compound 4-chlorophenol was used as a model for comparing the efficiency of different AOP systems (Advanced Oxidation Processes), based on the degradation of said compound, demonstrating that an ozone treatment achieved between 59% and 60% of mineraization, during a 6 hour period, or a 4 hour period for an ozone/UV treatment was necessary, and a period of 2.5 hours for the photo Fenton system was necessary, while when the UV/Peroxide system was used, the decomposition was not achieved. On the other hand, regarding the reactivity upon organic compounds, it was demonstrated, that the degradative levels are highly dependent from the chemical structure of substrates, finding that phenol substrate is more reactive than chlorophenol substrate. It has been shown that an effluent with a high content of non biodegradable organic compounds, can be degraded by means of homogenous as well as heterogeneous photo oxidative systems, significantly raising the effluent biodegradability in few minutes of reaction, being the titanium dioxide ($TiO_2$) semiconductor system the most efficient, removing 80% of TOC and diminishing the by 50% the effluent toxicity. On the other hand, a rotatory photocatalytic reactor was designed, which was used for degradating phenol. The degradation efficiency was compared using a mercury lamp with a UV light (wavelength >254 nm), and sunlight. The researchers demonstrated that phenol can be quickly degraded and mineralized in the reactor by the UV lamp, and also, that it can be degraded in relatively short time periods when sunlight is used. The TOC in solution diminishes slowly, nevertheless, the disappearance of phenol occurs faster, which could indicate, that phenol is possibly mineralized into $CO_2$ through intermediate products, which could be useful as a carbon source for microorganisms in the case of a subsequent biologic treatment of the effluent, or simply if the effluent is poured over a water body after the oxidation.

During a textile effluent decomposition, using an immobilized catalyst, a 97-98% of the effluent color reduction was achieved, the total organic carbon (TOC), was reduced by 50%, and the effluent toxicity was reduced by 73%, on a 1 hour treatment period. When comparing the treatment with a suspended catalyst, the latter only achieved a 23% reduction of the total organic carbon (TOC) and a 28% reduction of the effluent toxicity, using the same immobilized catalyst, the decomposition continued using four coloring agents, selected from those that are most used for dyeing in the textile industry: Reactive Orange-16, Reactive Red-2, Reactive yellow-2 and Reactive Blue-19.

For a period of 30 minutes undergoing a photocatalytic treatment with each one of the coloring agents, between 48% and 50% of the organic matter was mineralized and the oxidation capability of the resting compounds, measured as DQO, shows a similar trend. The efficiency of the immobilized catalyst on the photocatalytic decompsition of a herbicide compound, Isoproturon (IP), one of the herbicides most used in Europe.

In collaboration with The Laboratory of Environmental Biotechnology, Institute of Environmental Engineering, the Swiss Federal Institute of Technology, Lausanne, Switzerland and the Plataforma Solar de Almería-España, the efficiency of the immobilized for the photocatalytic decomposition of Isoproturon, one of the most used herbicides in Europe, was tested. The herbicide was totally decomposed and the decomposition efficiency is compared with suspended catalyst efficiency. Further, it was once more demonstrated, that the catalyst efficiency is not reduced when the same is in an immobilized form, also it was established that after 300 hours of experimentation, the activity of the same is not affected.

Reactors applied for the treatment of atmospheres and effluents, are known, as the "Apparatus for High Flux Photocatalytic Pollution Control Using a Rotating Fluidized Bed Reactor" from the Florida Central University.

The U.S. Pat. No. 6,454,937, Horton et. al., the disclosure of which is incorporated herein by reference, describes an UV reactor for purifying water, which operational concept is similar. The reactor comprises UV light sources and ascending guide-pipes for leading the waste water entrance by the lower part of the reactor, wherein once treated the water returns to the exit at the lower part of the reactor by the outer side of the pipes, wherein said part does not operate as a catalyst.

On even an alternative embodiment of the present invention, the method for using the photocatalyst of the present invention further to the radicals produced by the Ozone degradation ($TiO_2/UV/O_3$) is disclosed. The state of the art exhibits a plurality of studies related with organic compounds photo-oxidation, principally for compounds of the phenolic type, (Beltrán y et al., 1995 a, b; Preis et al., 1995; Beltrán et al., 1996 a,b; Pichat et al., 1996); which are used as a model, with the purpose of studying the mechanisms involved in the decomposition, and where it has also been demonstrated, that the photo-oxidative systems are efficient regarding the mineralization process. Some researchers, as Prado et al., (1994) and Tang H. (1996), have used compounds as a model for the study of oxidation, specifically phenolic-chlorine compounds, such as 2,4-dichlorophenol, 2,4-dichlorophenoxyacetic acid (2,4-D), in order to assess the subsequent application of the same in the removal of pesticides and herbicides from waste waters or in the treatment of industrial wastewaters. The oxidation of these compounds is so efficient, achieving the total mineralization, after a short treatment period. In photocatalytic oxidation systems, Mansilla et al., (1994), studied the decomposition of black liquor from the Kraft pulp process, the liquor principally comprises phenolic compounds derived from lignin in high concentrations, where it is concluded that a 96% mineralization of phenolic derivatives occurs due to photocatalysis and not through another route.

Bauer R. and Fallmann H. (1997), used 4-chlorophenol as the model for an organic compound, for comparing the efficiency of different AOP systems upon the decomposition, establishing that it achieves a 60% of mineralization on a 6 hour period during an ozone treatment, or a 4 hour period using the ozone/UV system and a 2.5 hour period for the Photo-Fenton system, while with a UV/Peroxide system no decomposition was achieved. On the other hand, referred to reactivity measures upon organic compounds, it was demonstrated that the decomposition levels are highly dependent from the substrates chemical structure, finding that the phenol substrate is more reactive than the chlorophenol substrate. Yeber et al., (1999), demonstrated that an effluent with a high content of non biodegradable organic compounds, can be decomposed through homogeneous as well as heterogeneous photo-oxidative systems, increasing significantly the effluent biodegradability in few minutes of reaction, being the system that uses semiconductor the titanium dioxide ($TiO_2$), the most efficient, with a 80% removal of TOC and diminishing by 50% the effluent toxicity. On the other hand, Toyoda et al. (2000), designed a rotory photocatalytic reactor, which was used for decomposing phenol. They compared the decomposition efficiency using a UV lamp (wavelength >>254 nm), and sunlight. The authors showed that phenol can be quickly degraded and mineralized in the reactor comprising the UV lamp, and that also it can be degraded in relatively short periods when it is applied with sun light. The TOC value of the solution diminishes slowly, nevertheless, the phenol disappearance is faster, which could indicate that phenol is possibly mineralized into $CO_2$ by means of intermediate products, which could serve as carbon source for the microorganisms in the case of a subsequent biologic treatment of the effluent, or simply if this one is poured in a water body after the oxidation.

On the decomposition of a textile effluent, using the immobiblized catalyst, was possible to reduce the effluent color in 98%, the Total Organic Carbon (TOC) in 50% and the effluent toxicity in 73%, for 1 hour period of treatment.

Comparing the treatment with a suspended catalyst, the latter only achieved a 23% of reduction of the TOC and 28% of the effluent toxicity reduction. Lizama et al., (2001) using the same immobilized catalyst continued the decomposition of four of the most used dyes in the industrial textile dyeing, Reactive Orange-16, Reactive Red-2, Reactive yellow-2 and Reactive Blue-19. After having passed 30 minutes of the photocatalytic treatment with each one of the dyes, the 50% of the organic matter was mineralized and the oxidability of the resting compounds measured as DQO, shows a similar trend. In collaboration with The Laboratory of Environmental Biotechnology, the Institute of Environmental Engineering, the Swiss Federal Institute of Technology, Lausanne, Switzerland and the Plataforma Solar de Almería-España, was tested the immobilized catalyst efficiency on the photocatalytic decomposition of the herbicide Isoproturon (IP), one of the most used herbicides in Europe.

The herbicide was totally degraded and the decomposition efficiency is compared with the efficiency of the suspended catalyst, furthermore, once more, it was demonstrated that the efficiency of the catalyst is not reduced when this one is immobilized, being possible to establish that after 300 experimentation hours, the activity is not affected. These results were published by Parra et al.

On the other hand, the international literature comprises the addition of some substances which are capable of enhancing the production of radicals, and therefore the degradation of pollutants, is the addition of substances in the solution or the dopping of the catalyst with any compound. In 2002, Jaesang L. carried out these type of experiences, wherein he increased in about 20% the dissolved ammonium degradation with $TiO_2$/UV plus 80% air using $TiO_2$ doped with Platinum and injecting $N_2O$ during the process. Though, the ammonium degradation is increased, the economic viability (by the use of platinum) and the environmental viability (by the use of $N_2O$, gas from the greenhouse effect) makes difficult its use in a massive way.

However, the use of Hydrogen Peroxide ($H_2O_2$) or Ozone ($O_3$) is feasible as a producer of radical under UV light, which have demonstrated their efficiency for degrading organic aromatic compounds, among others (Hapeman-Somich et al., 1992 a,b, Paton et al., 1994, Mokrini et al., 1996).

SUMMARY OF THE INVENTION

The advantage of the process of the instant invention, is that it does not require previous fitting periods of the culture waste water for the photocatalytic treatment system, further to the radicals produced by the Ozone degradation ($TiO_2/UV/O_3$). The process does not produce solids or sediment compounds, which must be removed or eliminated, being that the removal is stable and continues throughout time.

The process can be applied for treatments requiring the presence of antibiotics, which is necessary on intensive aquaculture, unlike those systems depending from biologic filters. Likewise, the claimed process operates at low temperature conditions maintaining the removal efficiency, unlike those biologic filtration systems, which must be stable at their temperature since they depend on degrading bacteria, which work between 14 and 28° C. Further, for the process operation, minimal conditions related to the water pollutant concentration nor a stabilization time period are not required, as needed by the biologic filter systems.

Additionally, the process allows generating the disinfection of waste water and the removal of nitrite and dissolved organic matter.

The process requires an operation term, for treating part of the total water volume from the original system.

The main characteristics associated with the design and operation of catalytic reactors using a supported catalyst can be summarized as follows:
  the light energy that effectively reaches the catalyst, which depends on the absorbance of the fluid to be treated (the energy loss is directly proportional to the absorbance of the fluid);
  the amount of emitted energy by the UV light source (the light energy is inversely proportional to the source wavelength);
  the distance between the light source and the supported catalyst (the energy loss is directly proportional to the square of the distance between the source and the radiated surface);
  the angle of incidence of the light energy on the catalyst surface (the energy loss is inversely proportional to the cosine of the incidence angle);
  the area of the catalyst effectively radiated, which depends on the configuration and distribution of the supported catalyst and mainly of the variables that define the light energy that reached the catalyst.

It is important to emphasize that the photochemical reaction (mass transference) occurs on the contact surface between the treated fluid and the catalyst, therefore, reason why it is necessary that the reactor design maximize effectively the catalyst radiated.

The fluid turbulence within the reactor is directly related to the place where the catalyst generates the mass transference of the pollutant compound, the contact surface between the catalyst and the fluid. The rate removal of the dissolved pollutant is directly related with the fluid turbulence within the reactor, since the contact between the pollutant particles and the catalyst surface is increased, when a higher exchange of the fluid to be treated on the reaction surface is generated.

The objective of the reactor of the present invention is to remove ammonium, dissolved organic matter and to disinfect the waste water from confined aquaculture, including culture systems for fish, shellfish and crustacean, on their egg-larvae production phase, juvenile-seeds, fattening-growth, antibiotic application and maintenance of reproducers.

The reactor of the present invention has a cylindrical configuration in which inner part five ultraviolet lamps are arranged and a plurality of glass plates (36) covered with supported titanium oxide ($TiO_2$).

The reactor design features include a cylindrical configuration that facilitates its construction. The supported catalyst is arranged in an annular type distribution around UV light lamps. The modular configuration facilitates its assembly and maintenance, and allows handling of different capacities and configurations (series and/or parallel) for waste water treatment. The reduced size of the reactor facilitates its transport and installation.

The operational features of the reactor include that it does not require to recover the catalyst from the treated water, and it does not require thermophilic conditioning.

The reactor uses features of the Advanced Oxidation Process (AOP), and specifically the supported heterogeneous photocatalysis and the production of radicals through the ozone degradation, activated by an artificial UV light source.

The reactor requires a flow control, a previous pH conditioning, previous mechanical filtration and time residence control in the process (of recirculation) of the water to be treated.

The substitute or competitor generic technologies, are directly related with the above mentioned removal and disinfection abilities. However, nowadays there does not exist a technology in the market that is able to carry out the three functions simultaneously, such as those described for the photocatalytic reactor and the production of radicals through the ozone degradation.

In an embodiment of the instant invention a photochemical reactor is developed, which allows the function of the supported heterogeneous photocatalysis process, further to the use of ozone for the production of hydroxyl radicals, for being applied in intensive aquaculture systems.

DETAILED DESCRIPTION OF THE INVENTION

The present invention will now be described in more detail, making reference to the accompanying figures, which illustrate the following:

The following describes in detail, a preferable embodiment of the present invention.

Figure 13:
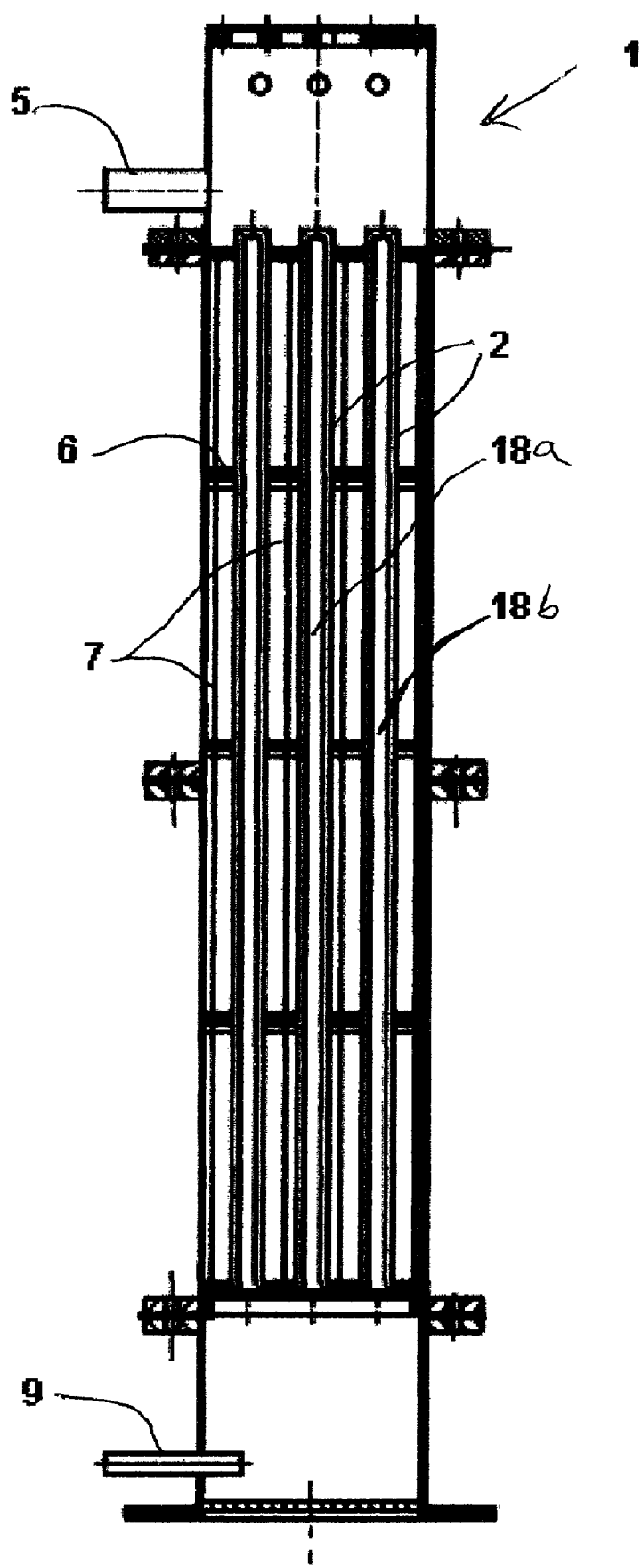
FIG. 13 shows a partial cross-sectional view of the reactor showing the outer shell, quartz tubes, UV lamp, glass plates with immobilized catalyst, distribution plates, and inlet and outlet piping.
Figure 14:
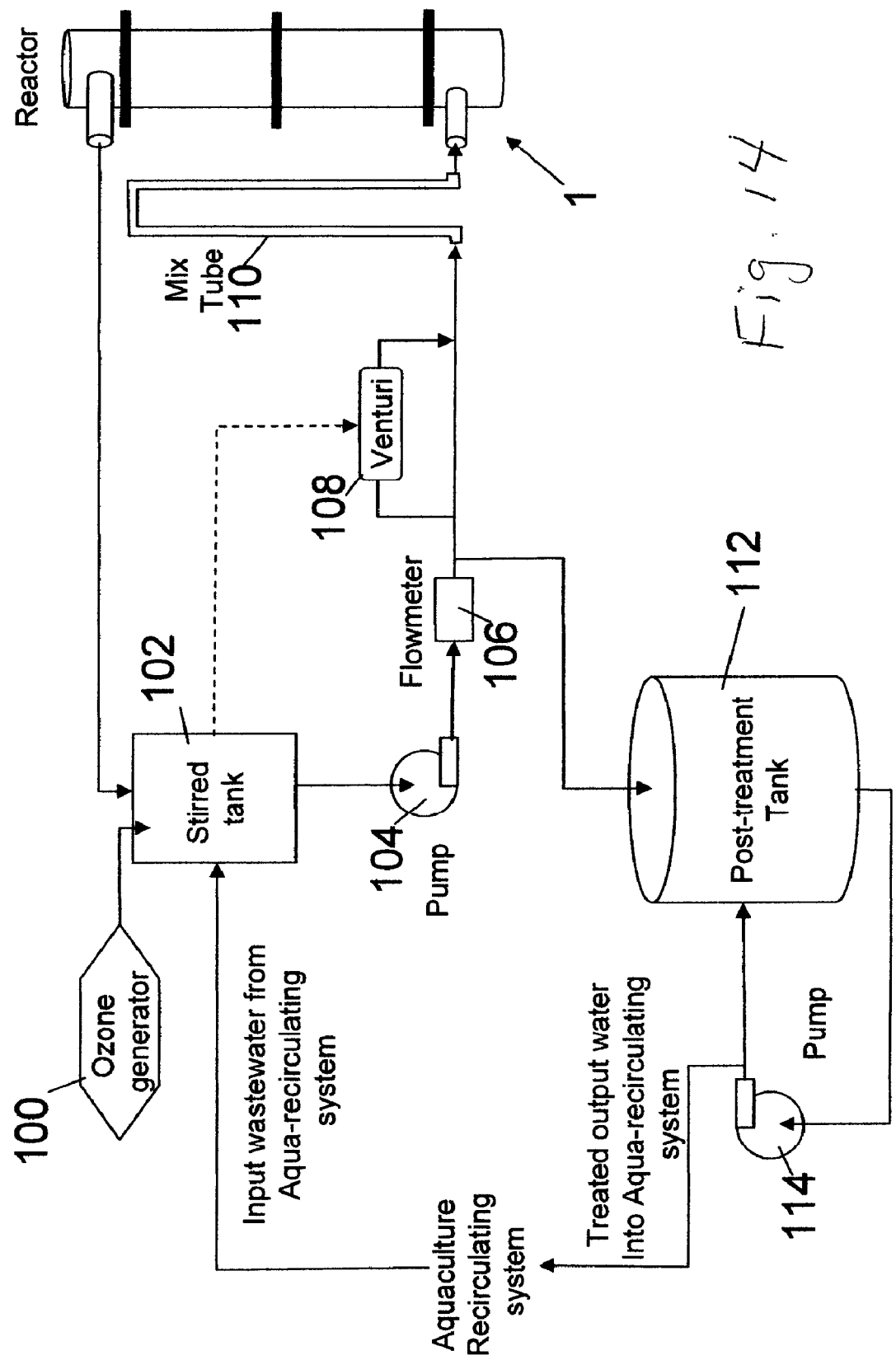
FIG. 14 shows a generalized schematic diagram of the aquaculture recirculating system with the photocatalytic reactor.

FIG. 13 shows a partial cross-sectional view of the reactor showing the outer shell, quartz tubes, UV lamp, glass plates with immobilized catalyst, distribution plates, and inlet and outlet piping.

Figure 1:
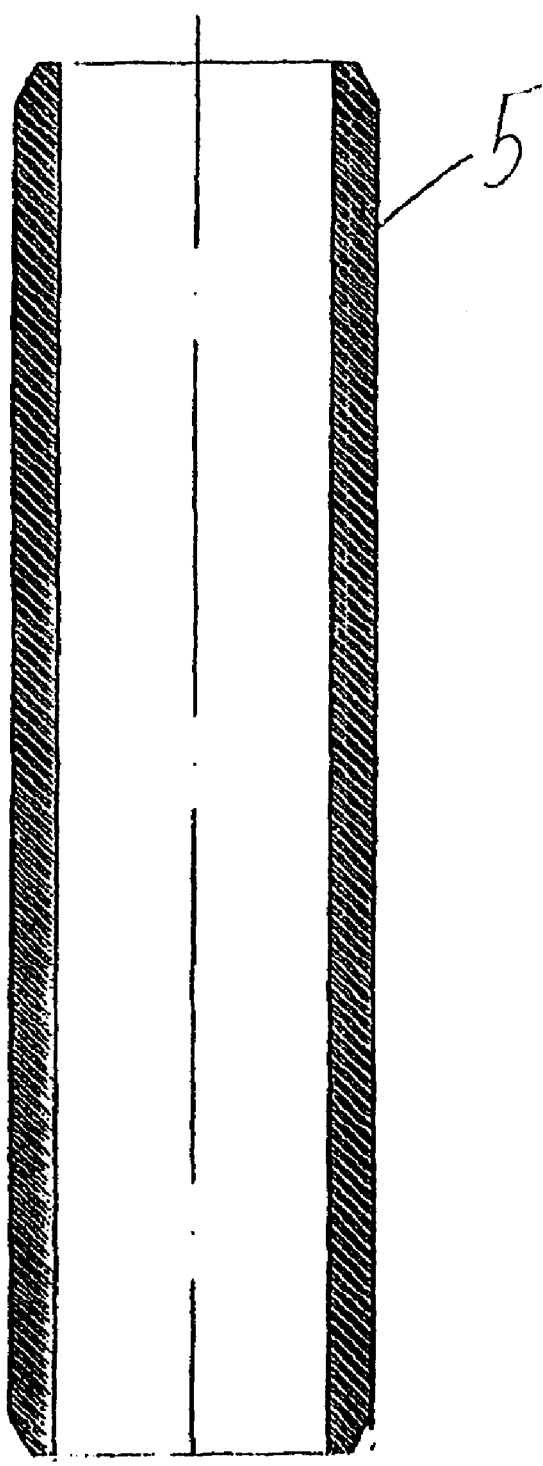
FIG. 1 shows a cross-sectional view of the water outlet pipe of the reactor.
Figure 2:
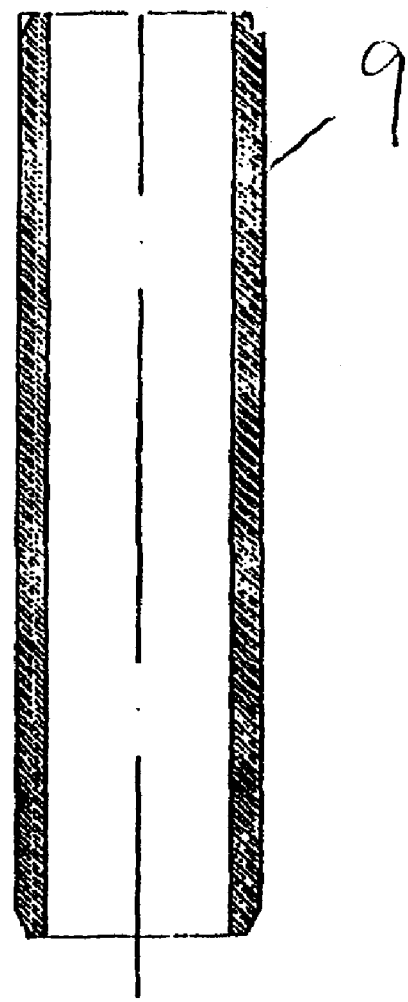
FIG. 2 shows a cross-sectional view of the water intlet pipe of the reactor.
Figure 3:
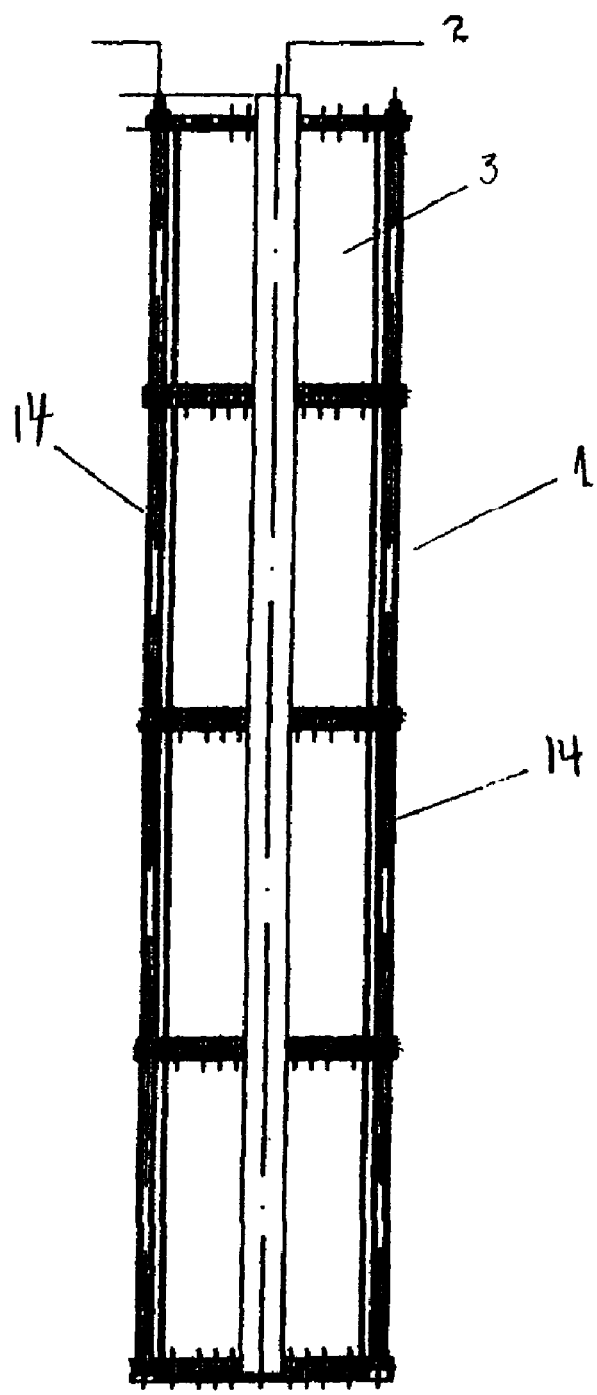
FIG. 3 shows a cross-sectional view of the reactor, wherein is observed the central tube (made of quartz), the fixation discs of the glass plates, the external tubes and the clamping bolt.
Figure 4:
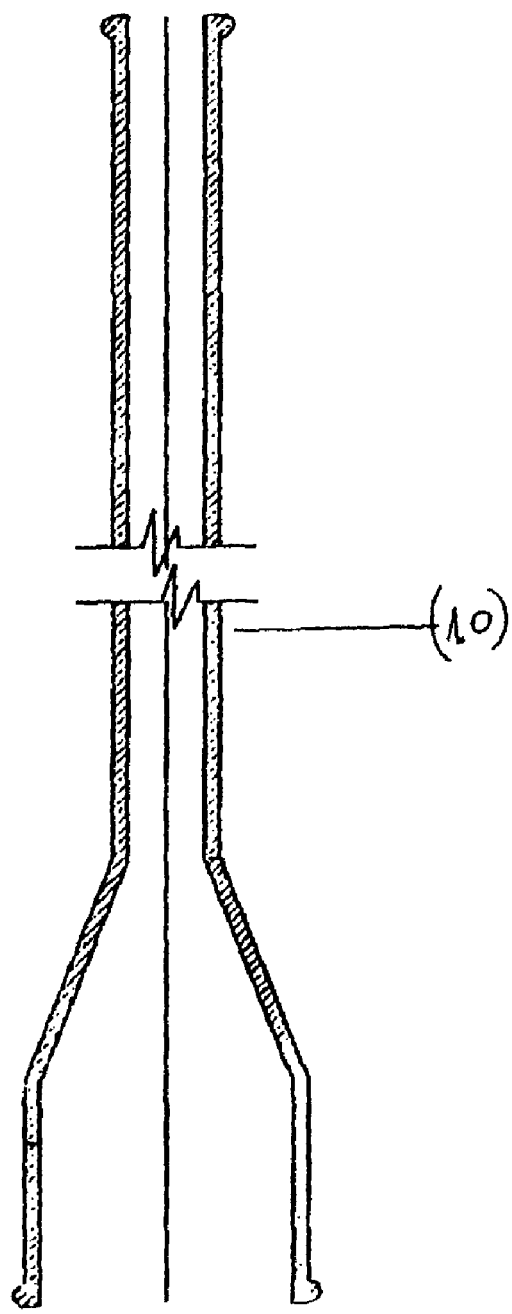
FIG. 4 shows a cross-sectional view of the electrical cables protector, for the electric feeding of the UV lamps.

FIG. 2 shows the reactor 1 of the present invention having a construction of generally a cylindrical configuration, with an external diameter typically of approximately from 240 to 260 mm and a height typically between 1,500 to 1,890 mm, and an inner diameter typically between 200 to 280 mm. The reactor is constructed of black polyethylene material, having an approximate total capacity from 60 to 70 liters and a maximal operation flow from about 60 to 120 liters per minute. On the inner portion are vertically arranged a plurality of UV lamps 18 (UV-C) each with a length of 1.2 m (power rating of 75 or 35 watts), each protected within and surrounded by a cylindrical quartz tube 2 of the same length, in order to avoid the direct contact of the quartz with water. The specific reaction area is approximately 36 to 60 m² per each cubic meter. The reactor uses 36 glass plates which are covered with titanium oxide ($TiO_2$), and offer a total impregnated surface of approximately from 2.6 to 3.0 ms². The inner cylindrical wall of the reactor is covered by a stainless steel film, with mirror finish, of 0.8 mm thick.

In an alternative embodiment, can be considered a design with a higher amount of UV lamps on the photocatalytic reactor, for example, as a reactor provided with 11 UV lamps corresponding to 89 glass plates covered with the catalyst ($TiO_2$).

The U.S. Pat. No. 6,414,213, Ohmori et. al., the disclosure of which is incorporated herein by reference, describes a system for impregnating surfaces with titanium oxide ($TiO_2$), to be used as a catalyst.

The cylinder 4 forming the reactor is divided in four sections 3a-3d. The lower section 3a consists of a small, cylindrical chamber 4 into which enters the wastewater to be treated through a pipe or tube 9, typically with a 25.4 mm (1 inch) diameter, the chamber has a capacity of about 48 liters. The second section 3b and third section 3c, which when joined total 1,200 mm of height, comprise the photochemical reaction chamber, comprising the lamps 18 protected with the quartz tubes 2, catalyst-impregnated glass plates 7, a stainless steel housing, and the support discs 6 having guides 20 for the glass plates 7 and a plurality of apertures 8 that serve as swirlers or turbulence promoters. The last, upper section 3d is a cylindrical chamber 4 wherein is found the discharge tubes or piping 5 typically with a 50.8 mm (2 inch) diameter, the inlet of the electrical connectors for the UV lamps through the corresponding protector 10, and the perforations 8 for the dispersal of the gas produced by the reaction.

Figure 5:
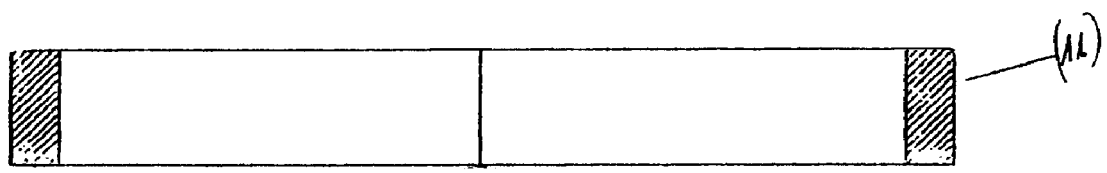
FIG. 5 shows a cross-sectional view of a support ring.
Figure 6:
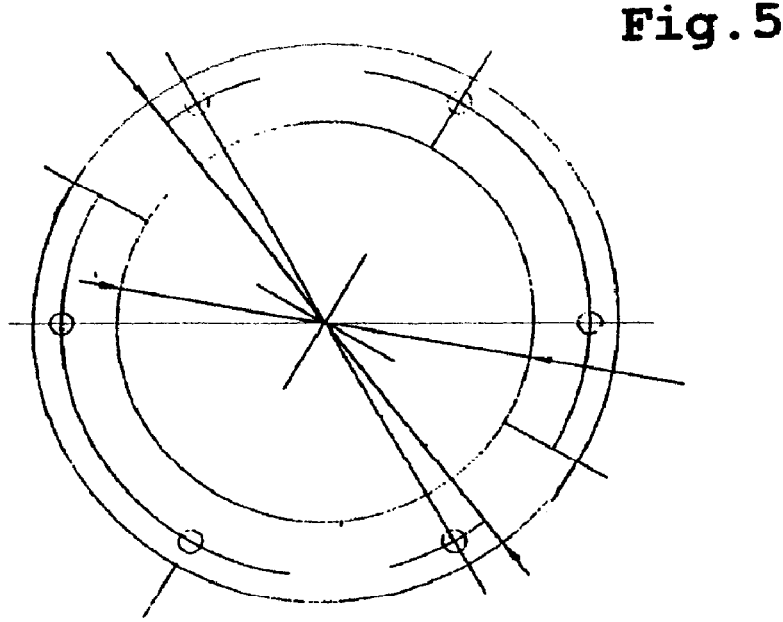
FIG. 6 shows a ground or plan view of a packing for the tubes conforming the reactor.

Finally, all these sections, are joined by flanges with rubber packing 11 that is shown in FIG. 5.

The lamps 18 (UV-C) are distributed as follows: a lamp 18a on the reactor centerline, surrounded by the other four lamps 18b distributed in a radial form to the first lamp (at 90° one of each other), their centerlines forming a circle. The spacing between the outer surface of the quartz tube 2 protecting the central lamp 18a and the other four lamps is typically about 40 mm.

The lamps, five in the preferred embodiment, are surrounded by 36 glass plates 7 covered with the titanium oxide which is supported on the two main faces of the glass. Each glass plate 7 typically has a height of about 30 cm, a width of about 3 cm, and a thickness of about 0.25 cm. The plates 7 are arranged parallel to the vertical axis of the lamp(s) 18, and are supported at each end in grooves formed in the support discs 6. The distance between the glass plates 7 and the outer surface of the quartz tube 2, which protects the lamp, is typically about 1 cm to 2.5 cm. The glass plate surfaces 17 that are not directly radiated by the lamps 18b are radiated by the central lamp 18a and by the radiation reflected from the inner wall of the reactor, from the stainless steel sheet 16 covering it.

In order to assure the plates position around the lamps, are used PVC support discs 6 having 23.6 cm diameter and 1.0 cm thickness (FIGS. 7 and 8), provided in a perpendicular form to the cylinder axis conforming the reactor. The support discs have holes 12 for passage therethrough by the lamps 7, and disc grooves 20, within which are introduced and affixed the ends of the glass plates 7, fixing their positions and orientation around the lamps 7.

Furthermore, the discs 6 have apertures 8 typically with 9.5 mm (⅜ inch) diameter, through which the water to be treated is forced to pass, generating a strong turbulence in the solution contained within the reactor.

Finally, the cylindrical reaction chamber 3 is comprised of four floors of $TiO_2$ catalyst-impregnated glass plates 7, and the height of the floors is spanned by the UV lamps 18, which are protected by quartz tubes 2. The floors are formed by the support discs 6 which support the ends of the glass plates 7, and four copper tube spacers 13 that maintain the spacing between the discs 6. All the plates and spacers are linked by four stainless steel rods 14 with 9.5 mm (⅜ inch) diameter, with wires and nut at their ends, to link together the floors. This allows forming a supported catalyst package, which is ready to be excited by the UV light energy issued from the UV-C light lamps, during the passage of the water to be treated.

The use of UV-C lamps (wavelength: 254 nm), allows achieving the maximal energy or radiation of the catalyst. This property diminishes as the wavelength increases of the type A or B UV light. Additionally, the use of this germicidal lamp allows disinfecting the water while it is treated for the elimination of other toxic compounds.

The design and configuration of the reactor, the sections linked by flanges and the use of the independent support discs 6, allow to easily change the plates 7 having the supported catalyst. The impregnated plates 7 can be changed individually or as groups, if the catalyst exhibits a wear problem or its loss due to friction. Likewise, the lamps and quartz tubes can be easily replaced.

The distance between the plates 7 with catalyst supported and the UV-C light source 18 is 1 cm to 2.5 cm. According to the experimental assays, this distance assures that the higher surface of the plate gets radiated. A longer distance produces a decrease of the light energy that is radiated on the supported catalyst, since this is inversely proportional to the square of the spacing distance between them. Further, the longer distance increases the adverse effect of the water absorbance between the light source 18 and the plate 7 with catalyst. On the other hand, all the radiation surface of the UV-C lamp 18 is used on the reactor, always keeping the 1 to 2.5 cm distance between the source and the plate.

The light energy generated by the UV-C light lamp 18 arrives onto the facing surface of the impregnated plates 7 in a perpendicular way, assuring the maximum irradiation. If the angle of incidence of the light onto the plates or other substrate is lower than 90°, the light energy falling on the plate decreases according to the cosine of the angle, according to the Lambert Law.

There are other patented configurations for a supported catalyst reactor, which are intended to obtain a higher surface of catalyst irradiated (such as screen sedimentary baffles), through a decrease of the incidence angle and enhancing the catalyst specific surface. Although it is feasible to increase on this form the irradiated area, the energy that reaches to the catalyst, is which really allows its excitation, drastically decreasing the cosine of the angle.

The central UV-C lamp 7a of the reactor and the stainless steel housing 16, with mirror finish, allow to irradiate the rear face of the impregnated plates, taking advantage of all the light energy generated in the reactor, by reflection in the steel or by direct incidence.

In order to assure the turbulence within the reactor of the present invention and to increase the contact between the pollutant substances that are dissolved in the water and the supported catalyst on the glass plates (mass transference), the five horizontal discs 6 have apertures 8 of about 9.5 mm (⅜ inch) diameter through which the water is forced to pass.

Figure 8:
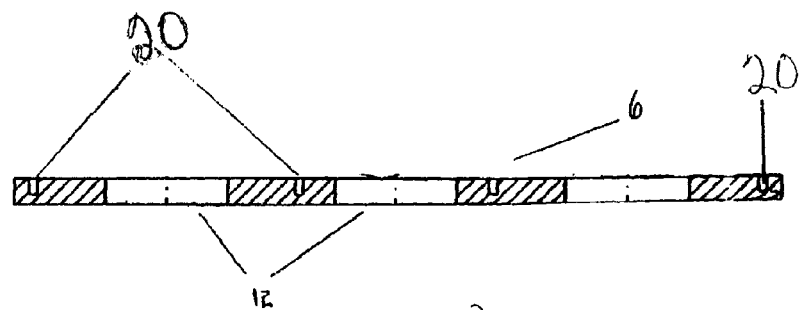
FIG. 8 shows a cross-sectional view of the disc from FIG. 7.
Figure 7:
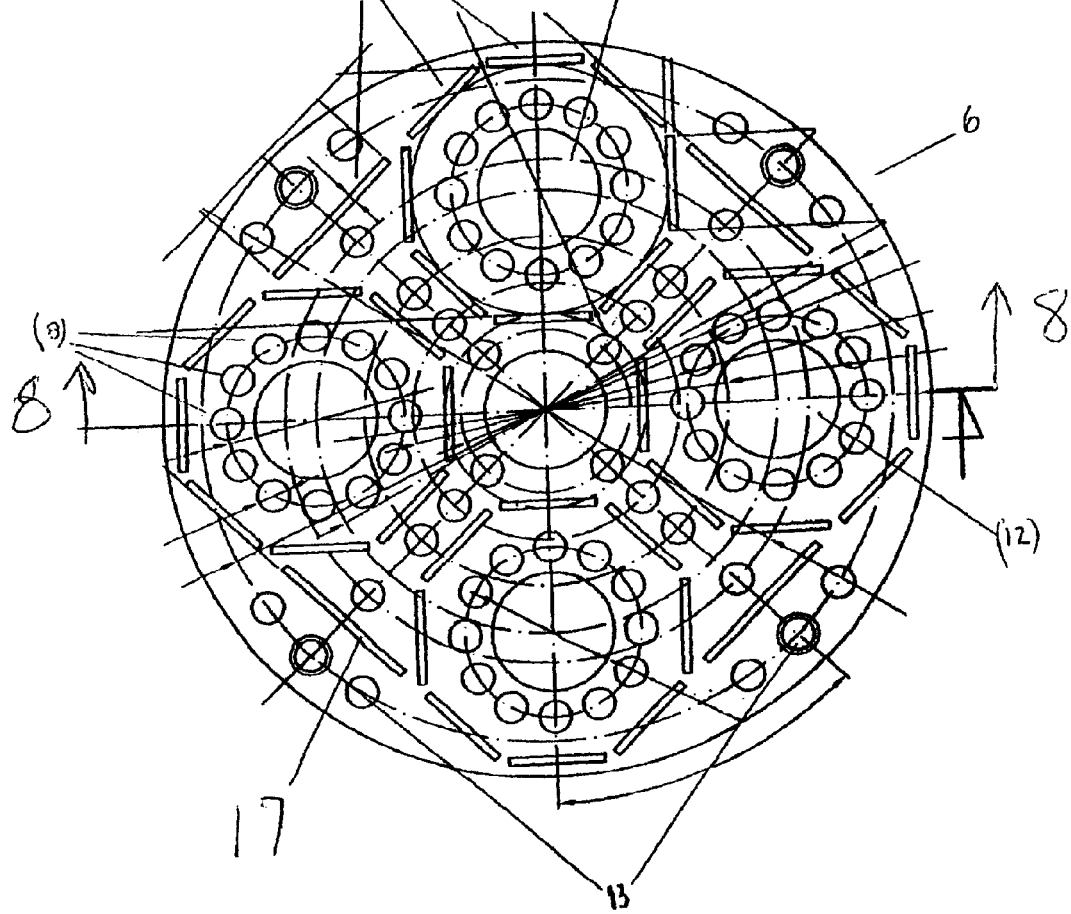
FIG. 7 shows a plan view of one of the support discs for the glass strips carrying the catalyst and the opening holes of the quartz tubes, protecting the UV lamps.
Figure 9:
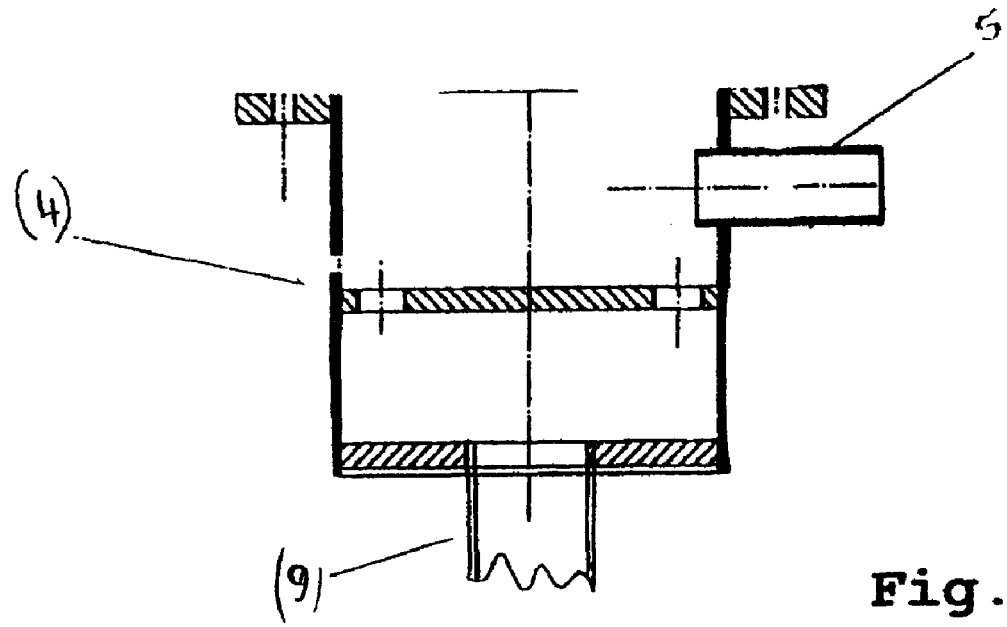
FIG. 9 shows a cross-sectional view of the lower section of the reactor.
Figure 10:
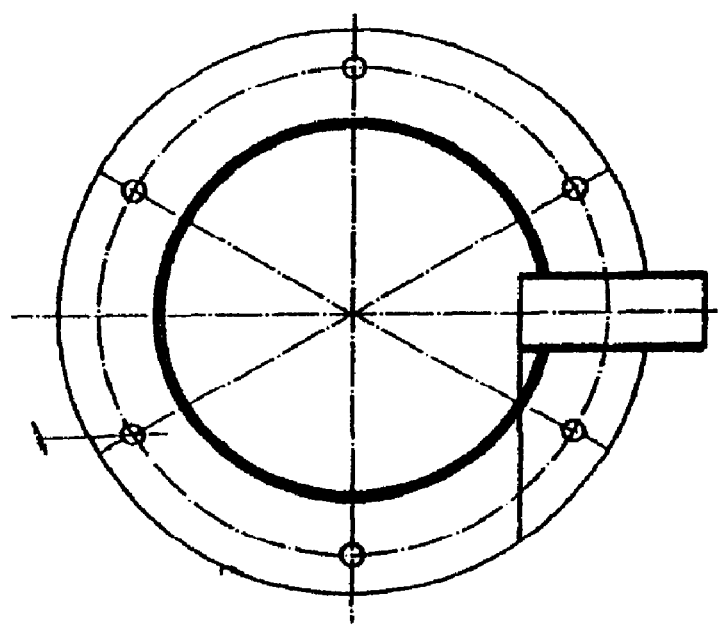
FIG. 10 shows a plane view of the lower part of the reactor.
Figure 11:
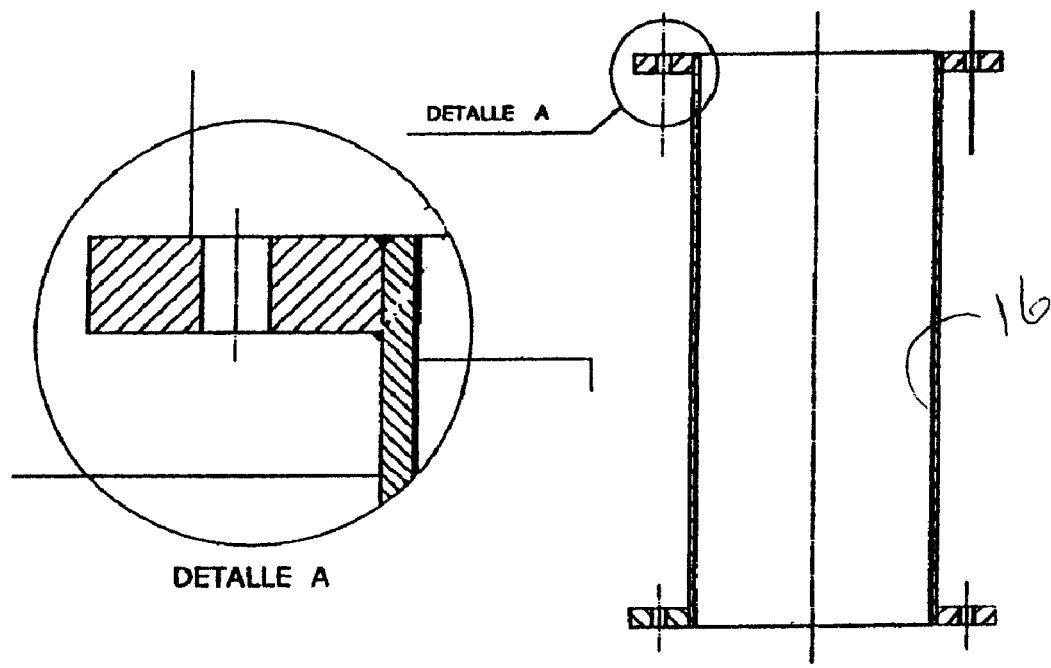
FIG. 11 shows a cross-sectional view of external tube of the reactor.
Figure 12:
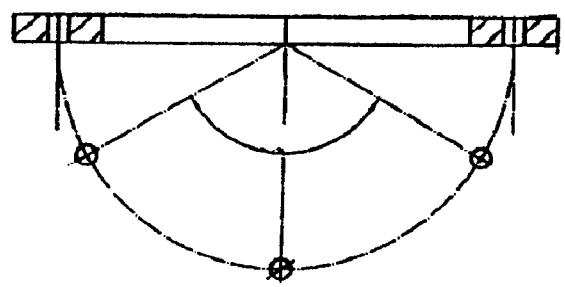
FIG. 12 shows a cross-sectional view of the lower fixation flange.

The apertures 8 are arranged on the support discs centered mainly between the glass plates and the light source (see FIGS. 7 and 8).

The use of rectangular common glass plates as substrate for supporting the catalyst, facilitates its easily obtaining, since it is highly available on the market, its impregnation and low cost. The use of other configurations, as cylinders, curved surfaces, and small glass spheres can be used, but may not produce the advantages described in the present invention for the plates 7.

The design and operation of the reactor is planned in order to operate as a treatment unit, facilitating its connection in series or parallel with other reactors of the same type, depending of the pollutant to be treated, the concentration of the same, the removal rate, the fluid volume or the space availability.

All the materials used for the construction of this reactor are generally available on market (standard manufacture dimensions and features), on fast way and low cost. There is not an issue or raw material requiring a special sizing or a previous treatment or conditioning, unless the catalyst support on the substrate.

TABLE 1

Design Features on approximated Measures

| Feature | Dimension | Unit |
| --- | --- | --- |
| Total height | 169 | cm |
| External diameter | 25 | cm |

TABLE 1-continued

Design Features on approximated Measures

| Feature | Dimension | Unit |
| --- | --- | --- |
| Inner diameter | 24 | cm |
| Reaction chamber height | 120 | cm |
| Water volume in the reaction chamber | 48 | L |
| Total water volume in the reactor | 64 | L |
| surface of plates with impregnated catalyst | 2.8 | $m^2$ |
| Specific reaction surface | 60 | $m^2$ per $m^3$ |
| Maximum operation flow | 60-120 | Lt/min |
| Light incident angle over the catalyst | 90 | ° |

In another alternative embodiment, the photocatalytic reactor of the present invention can be used for implementing and operating different processes, for purifying liquids containing or that have been polluted with toxic compounds, which use supported heterogeneous photocatalysis as the treatment basic principle. Said compounds can be selected from: phenols, organochlorine compounds, residues from cellulose plants, abattoirs, industrial processes plants, antibiotics and drugs production, wood preserving agents (pentachlorophenol), pesticides, metal ions, among others.

Even another embodiment of the present invention provides a method for using the photocatalyst means of the instant invention, which process can be used as above mentioned, in aquaculture for removing different compounds, based on the water pH value. At alkaline pH values (more typically 9 to 12) the system can be used for removing ammonium, nitrite, dissolved organic matter and disinfecting water. At a neutral pH value (more typically 6.5 to 8), the system can be used for removing nitrite, dissolved organic matter, disinfecting water, however it is very little efficient for removing ammonium. Both processes require of mechanic filtration of the water (between 40 to 60 µm) before to applying the process.

Water Purification Process with an Alkaline pH.

This process consists of two basic steps: a first step, a physical filtration step and pH adjustment, and a second step, corresponding to use of the photocatalytic system which is improved by the radicals produced by the ozone degradation ($UV/O_3/TiO_2$).

The process is capable of removing ammonium, nitrite, dissolved organic matter and disinfecting water simultaneously. Specifically, after a photocatalysis treatment of 1-2 hours, improved by the radicals produced by the Ozone degradation ($UV/O_3/TiO_2$) is achieved an ammonium level reduction from 45% to 65% %, nitrite between 80 to 100%, the organic matter reduction, measured as TOC (Total organic carbon) (mg/ml) from 30 to 40%, and as COD DQO (mg/L) (Chemical Oxygen Demand) between 40 to 70%, and the disinfection of the water, as part of the disinfection process produced by the UV Light and the hydroxyl radicals produced by the titanium dioxide, and ozone which act as germicides and bactericides.

Water Purification Process with a Neutral pH.

This consists of two basic steps, first, a physical filtration step and a second step, corresponding to the photocatalytic system improved by the radicals produced by the Ozone degradation (UV/O3/TiO2).

The process is capable of removing the dissolved organic matter and disinfecting the water simultaneously. Specifically, a photocatalysis treatment of about 1 to 2 hours is capable of reducing the organic matter, measured as COD (mg/L) (Chemical Oxygen Demand) between about 30 to 40%, and as TOC (mg/ml) (Total Oxygen Demand) between about 30% to 40%, removing among about 60% to 90% of the nitrite, and disinfecting of water, as part of the disinfecting process produced by the UV light and the hydroxyl radicals produced by the titanium dioxide and ozone, which function as germicides and bactericides.

The process, at an alkaline as well as at a neutral pH value, is not affected by the temperature changes, being the following variables, those that have the higher influence over the system efficiency, the good oxygenation and the optimal incidence of the UV light on the catalyst. Related to the latter variable, the catalytic system was optimized considering the maximum advantage of the light-catalyst, therefore defining the configuration of a plate reactor wherein the distance light-catalyst surface is from 2.3 to 2.5 cm, although a shorter distance is possible.

It is necessary to consider that the catalyst is supported, and that supported catalyst is more efficient than a catalyst in suspension or suspended catalyst since the contacting surface between the catalyst and the pollutant is increased. Further it is beneficial in the process to avoid the subsequent filtration and washing steps for recovering the catalyst.

The conventional way of removing, from the liquid wastes generated by the intensive aquaculture process comprising re-circulation systems, regarding nitrogenous compounds and the dissolved organic matter, considers the use of mechanic filtration for removing off the suspended and sediment organic matter, the ozone filters for the dissolved matter, which exhibit a high mortality risk due to the residual concentration, and the use of biological filters for removing nitrogenous compounds. The use of UV light has become the more commonly used water disinfection system, mainly due to its low cost, the reduced treatment time, and its minimal or null effect on the cultured species. However, its efficiency can be limited by the presence of suspended solids, which causes a "shade" or shield effect for bacteria and other microorganisms.

In the present invention has been developed a new alternative, which is totally different from the ammonium, nitrite and organic matter removal. The present invention considers a set of unitary operations characterized by a sequence of steps, within which, the main is constituted by the use of heterogeneous photocatalysis with a supported catalyst and radicals produced by the ozone degradation, for according to the operation conditions (pH), ammonium and nitrite removal, the dissolved organic matter and disinfecting wastewater from confined aquaculture.

The water treatment process is carried out independently from the circuit of the culture water, following an embodiment of a re-circulation system type "batch". It is to say, the water is withdrawn from the culture system, it is treated and subsequently returned to the same system.

The process can be used for removing ammonium, nitrite, dissolved organic matter and for disinfecting when the operation is carried out at an alkaline pH range. The process can be used for removing nitrite, dissolved organic matter and disinfecting the water at a neutral pH value. The process can be used in combination of the pH ranges for increasing the removal of the dissolved organic matter and for disinfecting.

In combined systems, the water to be treated must be previously conditioned, submitting it to a mechanical filtration process and adjusting the pH value, according to the water features and what is desired to be removed, pre- and post-treatment.

Thus, the step corresponding to the photocatalytic treatment is carried out in two sub-steps, which are arranged in series.

In the first sub-step is carried out the photocatalysis and the production of radicals by the ozone degradation at alkaline pH, for removing ammonium, nitrite, and dissolved organic matter, and for disinfecting. The alkaline pH range is comprised between 9-12. The second sub-step comprises removal of nitrite and dissolved organic matter, and the disinfection process, at a neutral pH value comprised between 8 and 7.

The water is withdrawn from the culture system, and prefiltered between 40 to 60 µm. The initial pH value of the water originating from the system is verified. If necessary, the pH value of the water is adjusted to a pH value comprised between 9 and 12, for subsequently begin to treat in a reactor submitting it to the supported photocatalysis and to the presence of radicals produced by the ozone degradation, during a period of time according to the initial ammonium concentrations in the original system. With such a treatment, is achieved a decrease of the ammonium, nitrite, the removal of the dissolved organic matter and the disinfection of the system, being said decrease caused by the photocatalytic process and by those radicals produced by the ozone degradation. Following the treatment the water must be prepared or conditioned to pH values near to a 7.5-8, the treated for removing nitrite and the dissolved organic matter, and disinfecting, being possible to return the treated water into the original system.

The Process has the Following Advantages:

It does not require previous conditioning periods for the photocatalytic treatment system.

The process does not generate solids or sediment compounds, which must be removed or eliminated, being the pollutants stable and continuous in the time.

The process can be applied under treatment conditions wherein are used necessary antibiotics for intensive aquaculture, unlike those systems dependent from biologic filters.

Likewise, the process can operate in low temperature conditions without losing its removal efficiency, unlike the biologic filtration systems, which must be stable at their operating temperature since they depend upon bacteria, which can degraded between 14 and 28° C.

Further, the process does not require of minimal conditions for the pollutant concentrations in water for operating nor a stabilization period of time as needed by the biologic filters.

Additionally, the process allows achieving the water disinfection and the removal of the dissolved organic matter.

EXAMPLES

As an example, a laboratory assay was carried out for the ammonium removal process, using a real sample of water from a trout (*Onchorynchus mykiss*) culture, from the Centro de Cultivo Piloto de la Universidad Católica de la Santísima Concepción, Chile.

The water from the culture was filtered at 45 µm and then prepared for the treatment using photocatalysis and the radicals produced by ozone. The pH value was increased to 12 using NaOH and the process was begun. The following corresponds to the obtained result:

| Treatment time (min) | Ammonium concentration (mg/l) | Nitrite (mg/lt) | Bacterial load (U.F.C.) | TOC (mg/lt) | DQO (mg/lt) |
|---|---|---|---|---|---|
| 0 | 2.4 | 1.2 | 10,300 | <1 | 65 |
| 60 | 1 | 0 | 0 | <1 | 40 |
| 120 | 0.95 | 0 | 0 | <1 | 25 |
| Replication | | | | | |
| 0 | 2.3 | 1.1 | 12300 | <1 | 60 |
| 60 | 0.97 | 0 | 0 | <1 | 40 |
| 120 | 0.9 | 0 | 0 | <1 | 27 |

The assays show that in two hours, the ammonium removal was 58%. Total disinfection was achieved and the dissolved organic matter was reduced by more than 50%.

Although some embodiments of the invention have been described, it should result obvious for the person skilled in the art that many modifications to the invention can be made without separating it from its spirit or scope. All the modifications comprised within the scope of the instant invention, are intended to be covered by the annexed claims.

We claim:

1. A process employing a photocatalytic reactor and an ozone gas to produce hydroxyl radicals for removing ammonium, nitrite and organic matter, and to purify and disinfect, waste water from a confined aquaculture system, the process being based on Advanced Oxidation Processes (AOP), the photocatalytic reactor being based on UV light sources and a supported photocatalyst based on titanium dioxide ($TiO_2$), wherein the photocatalyst is supported over glass plates fixed within the reactor at a pre-established distance from the UV light sources, where a portion of waste water from the confined aquaculture enters into a closed recirculating circuit, an ozone gas is introduced into the recirculating waste water, and the waste water containing the ozone gas is fed in a lower end of the photocatalytic reactor and submitted to a strong turbulence while passing through perforations in a support that forms the floor of the reaction chambers, wherein the recirculating waste water containing the ozone gas is treated within the photocatalytic reactor through heterogeneous photocatalysis, wherein the hydroxyl radicals (OH.) are produced by the destruction of the ozone gas by the UV light and by irradiating the photocatalyst with the UV light, and wherein the treated water is adjusted to a pH and returned to the confined aquaculture.

2. The process according to claim 1, wherein the UV light source comprises UV lamps.

3. The process according to claim 1, wherein the process is conducted at room temperature or lower.

4. The process according to claim 1, wherein the process further removes antibiotics from the recirculating waste water.

5. The process according to claim 1, wherein the process does not require a minimum concentration of a pollutant nor a stabilization period of time for its optimal function.

6. The process according to claim 1, wherein the closed recirculating circuit is a batch processing circuit, and the process is carried out on a batch portion of waste water that is withdrawn from the aquaculture, treated and then returned to the confined aquaculture.

7. The process according to claim 6, wherein when the batch portion of waste water to be introduced is adjusted to an alkaline pH of 9 and 12, the process simultaneously removes ammonium, nitrite, and dissolved organic matter, and disinfects, and wherein when the batch portion of waste water to be introduced is adjusted to a neutral pH of 8 and 7, the process simultaneously removes the nitrite and dissolved organic matter, and disinfects.

8. The process according to claim 1, wherein when the recirculating waste water to be treated is adjusted to an alkaline pH, the process simultaneously removes ammonium, nitrite, and dissolved organic matter, and disinfects, and wherein when the recirculating waste water to be treated is adjusted to a neutral pH, the process simultaneously removes the nitrite and dissolved organic matter, and disinfects.

9. The process according to claim 1, wherein the glass plates are located between 1 to 2.5 cm from the UV light sources.

10. The process according to claim 9, wherein the photocatalytic reactor has mirror finished surfaces, and the UV light sources are UV lamps.

11. The process according to claim 9, wherein the glass plates with catalyst are fixed at grooves on the floor supports, and wherein the glass plates are about 30 cm in height, 3 cm in width and 0.25 cm in thick.

12. The process according to claim 1, wherein the UV light sources are UV-C lamps emitting a light wavelength of 254 nm, and having a power rating of either 75 or 35 watts.

13. The process according to claim 12, wherein the UV-C lamps are each arranged within a quartz tube for avoiding their direct contact with the water.

14. The process according to claim 12, wherein the UV-C lamps comprise a central lamp and at least four other lamps arranged radially in a circular pattern around the central lamp at 90° increments, and extending the length of the reaction chambers through lamp openings in the floor supports.

15. The process according to claim 14, wherein the perforations of the floor supports are about 9.5 mm in diameter, and are arranged in a radial form around the lamp openings.

16. A process for treating a batch portion of waste water from an aquaculture water system containing ammonium, nitrite and organic matter, comprising the steps of:
   1) providing a photocatalyst reactor that includes (a) ultraviolet (UV) light sources, (b) glass plates supporting a titanium dioxide ($TiO_2$) photocatalyst that are fixed within the photocatalyst reactor at a pre-established distance from the UV light sources, (c) an inlet in a lower end of the photocatalytic reactor, and (d) a plurality of reaction chambers defined by support floors having perforations therethrough;
   2) introducing the batch portion of waste water from the aquaculture water system into a recirculating water stream of a recirculating treatment water system comprising the photocatalytic reactor and an ozone gas source;
   3) passing the recirculating water stream that contains the batch portion of waste water and ozone gas into the inlet of the photocatalytic reactor and through the perforations of the plurality of reaction chambers to create turbulence in the recirculating water stream passing up therethrough;
   4) irradiating the turbulent recirculating water stream passing across the supported TiO2 photocatalyst with UV light to produce hydroxyl radicals by the destruction of the ozone as by the UV light and by irradiating the photocatalyst with the UV light, for a time sufficient to remove a portion of the ammonium, nitrite and organic matter from the recirculating water stream;
   5) adjusting the pH of the irradiated, recirculated water stream; and
   6) returning a portion of the adjusted recirculated water stream to the aquaculture water system.

17. The process according to claim 16, wherein the UV light sources comprise UV lamps.

18. The process according to claim 16, wherein the process is conducted at room temperature or lower.

19. The process according to claim 16, wherein the process further removes antibiotics from the recirculating water stream.

20. The process according to claim 16, wherein the process does not require a minimum concentration of a pollutant nor a stabilization period of time for its optimal function.

21. The process according to claim 16, wherein when the recirculating water stream to be treated is adjusted to an alkaline pH, the process simultaneously removes ammonium, nitrite, and dissolved organic matter, and disinfects, and wherein when the recirculating water stream to be treated is adjusted to a neutral pH, the process simultaneously removes the nitrite and dissolved organic matter, and disinfects.

* * * * *